Figure 1:
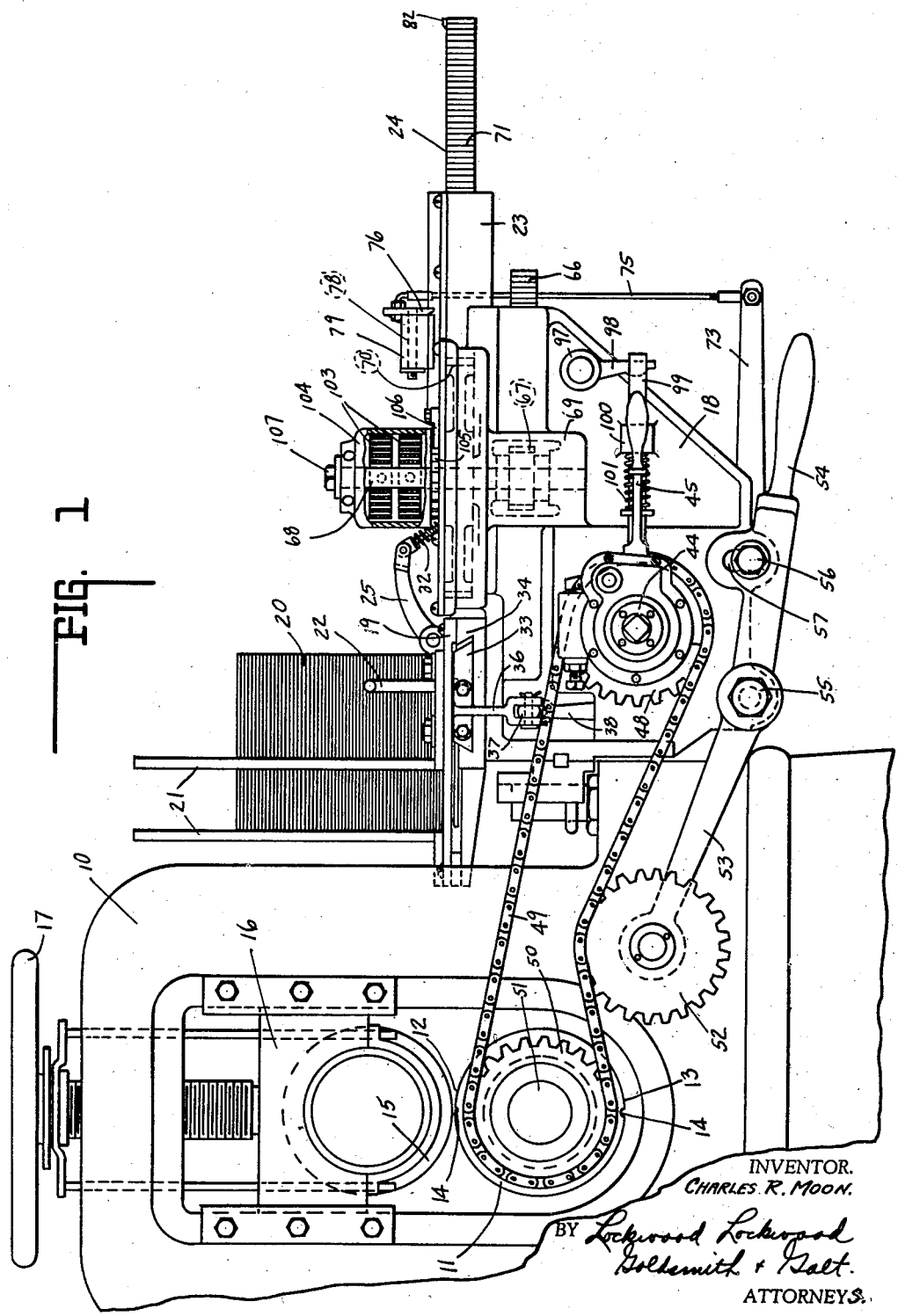

June 12, 1934. C. R. MOON 1,962,872
AUTOMATIC FEED FOR BLANKS
Filed July 1, 1933 4 Sheets-Sheet 1

INVENTOR.
CHARLES R. MOON.
BY
Lockwood Lockwood Goldsmith & Galt
ATTORNEYS.

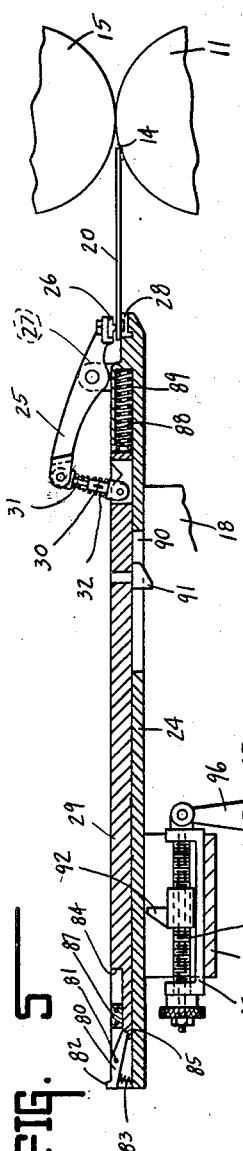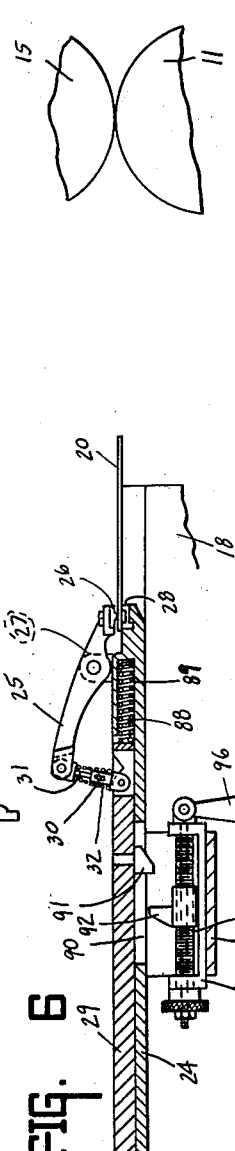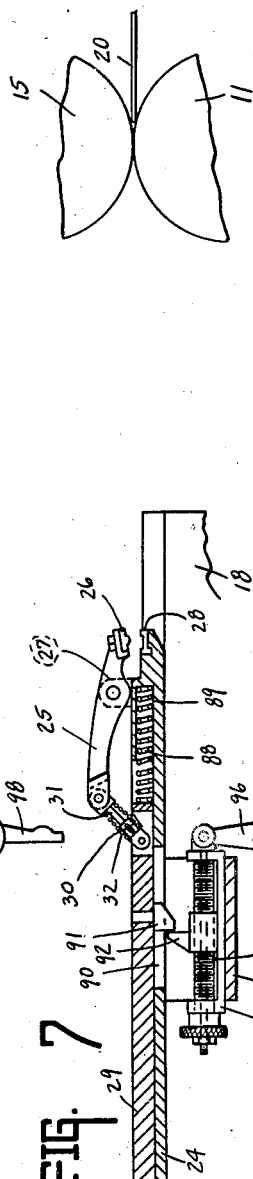

Patented June 12, 1934

1,962,872

UNITED STATES PATENT OFFICE 1,962,872

AUTOMATIC FEED FOR BLANKS

Charles R. Moon, Muncie, Ind., assignor to Ontario Manufacturing Company, Muncie, Ind., a corporation Application July 1, 1933, Serial No. 678,641

11 Claims. (Cl. 80—26)

This invention relates to an automatic feed of blanks to a machine, particularly adapted for use in feeding blanks to a break-down machine in the manufacture of tableware generally known as "flat silver".

In the manufacture of such articles as knives, forks, spoons and the like, there is commonly used a base metal, such as copper or white silver. The general shape of the article is stamped from such sheet material of a maximum thickness, after which the blank is passed through a break-down machine for thinning and spreading certain portions thereof. Such break-down machine usually comprises a pair of rollers, one of which is eccentric or cam-like in shape through which the blank is caused to pass. By reason of the terrific pressure imposed upon the blank as it is engaged between the break-down rollers, it is customary to feed it through the machine in two operations. In the first operation an operator presents the end of the blank to be reduced between the rotating rollers which engage and smash or break down the forward portion thereof. The blank is then immediately pulled back by the operator and again presented between the rollers to be engaged by the following cam surface which further breaks down the thickness of the blank, which then passes therethrough to an off bearing device. Thus, at each revolution of the rollers the blank is presented therebetween, retracted, and again presented.

It is the object of this invention to provide an automatic feeder for such machines and break-down operations as will mechanically effect the above-mentioned operations in the same manner as has been manually practiced by operators, thus effecting a material saving in labor costs.

To accomplish the foregoing, a stack of blanks is contained at the feed side of the break-down rollers and automatic means is provided for feeding the lower blank of the stack into position to be gripped by a travelling carriage. The movement of the carriage causes the gripping member to feed the forward end of the blank between the rollers at the proper time and then withdraw it, still maintaining its gripping action. The next movement of the feeding carriage presents the same end to another portion of the break-down rollers at the proper time, whereupon the gripping member is released so that the blank is free to pass between the rollers to be discharged at the off bearing end, whereupon the next succeeding blank is moved into position to be carried forward by the carriage.

Other features of the invention reside in mechanical devices for operating the feed, carriage, and gripping member in timed relation, as will be hereinafter more fully set forth and described.

Figure 2:
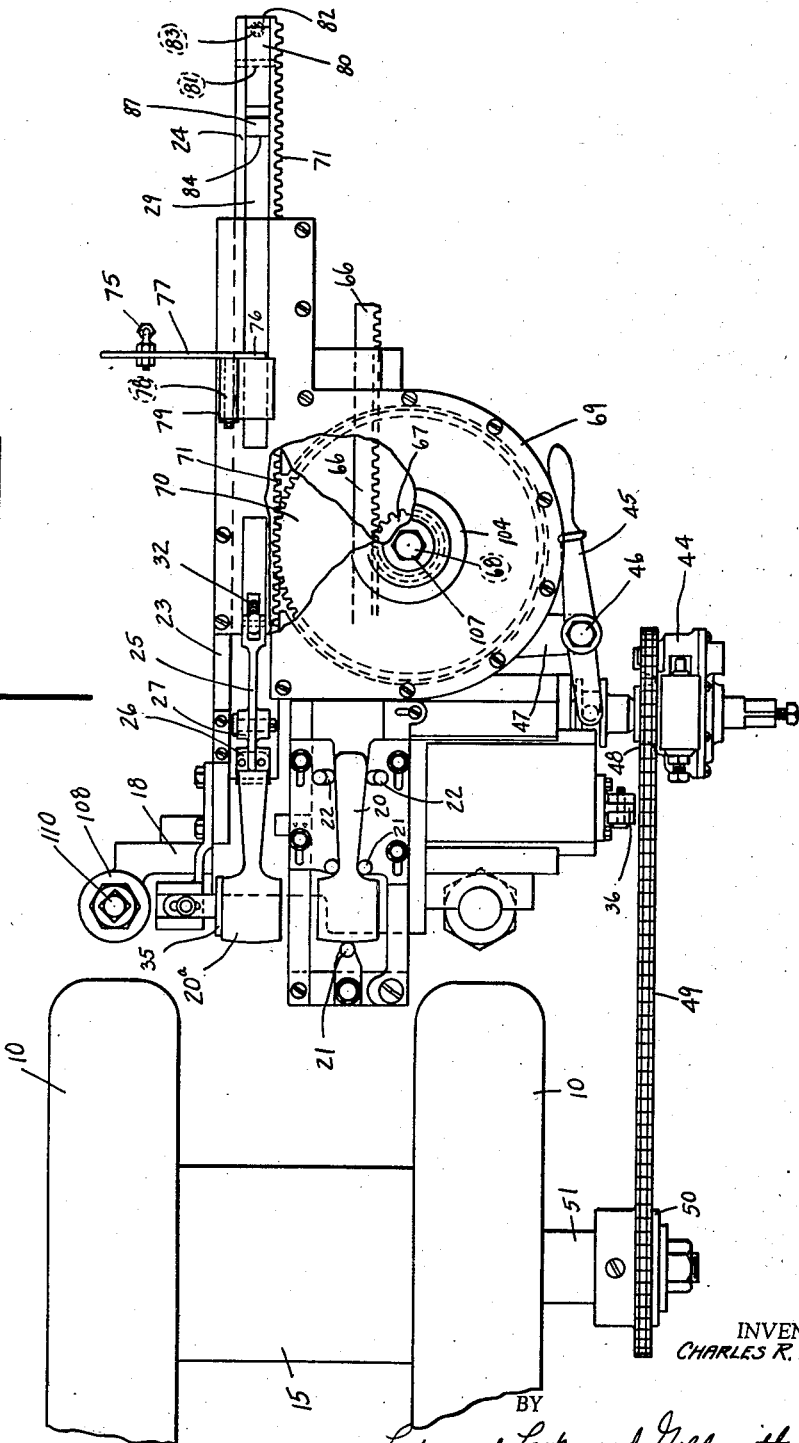
Figure 3:
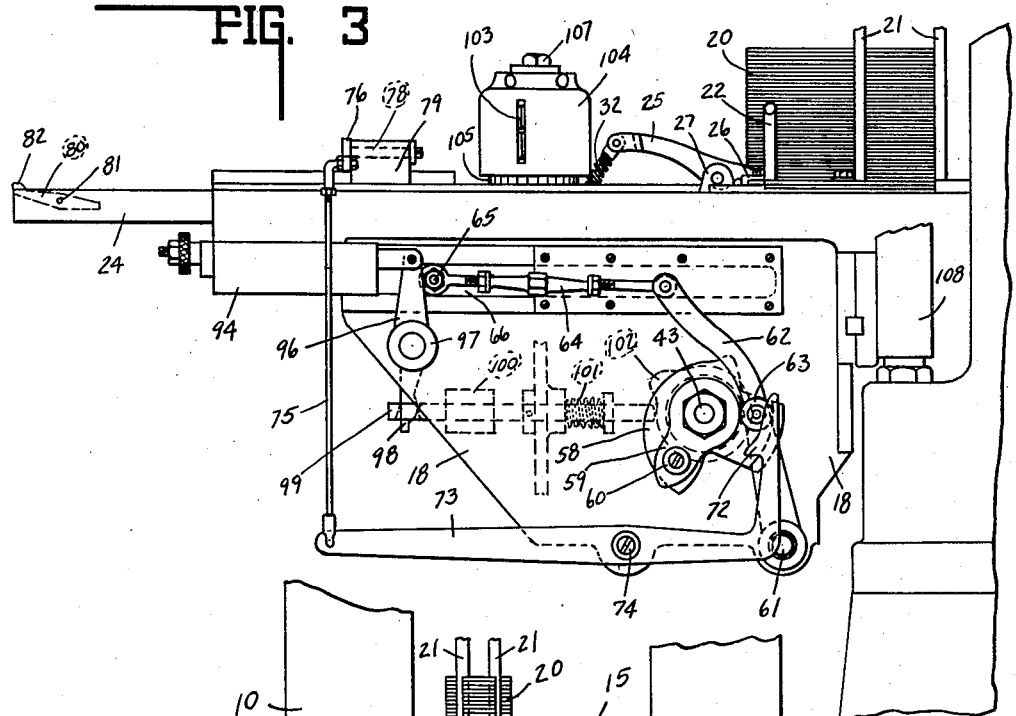
Figure 4:
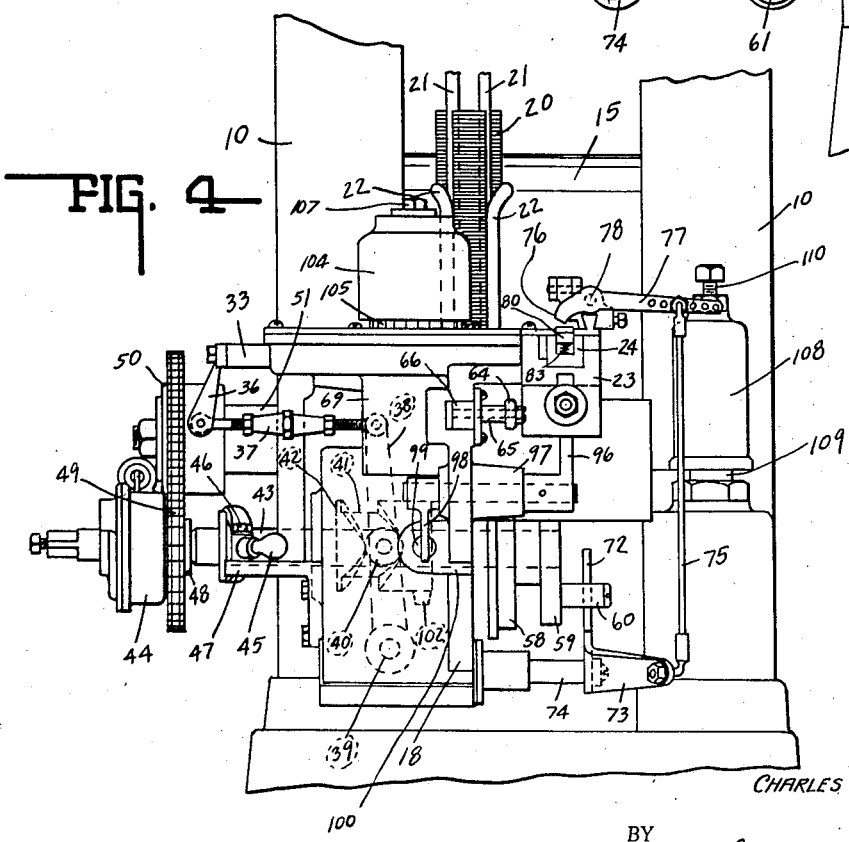

The full nature of the invention will be understood from the accompanying drawings and the following description and claims:

Fig. 1 is a left side elevation of the feeder facing the direction of feeding movement. Fig. 2 is a plan view thereof showing the carriage in full retracted position for receiving a blank. Fig. 3 is a right side elevation with the carriage retracted, as in Figs. 1 and 2. Fig. 4 is an end elevation. Fig. 5 is a sectional view of the feeding carriage in forward position. Fig. 6 is the same as Fig. 5 showing it in retracted position. Fig. 7 is the same as Fig. 6 with the jaws opened to receive a new blank.

In the drawings there is illustrated a break-down machine comprising the uprights 10 in which is rotatably mounted a lower eccentric or cam roller 11 having oppositely-disposed breakdown surfaces 12 and 13 in which there are formed longitudinal grooves 14. Immediately above said roller there is an adjustable cylindrical roller 15 carried by a sliding bearing block 16 which may be adjusted in the uprights 10 by a hand wheel 17. Mounted on the feeding side of the break-down machine there is a feeder comprising a frame 18 having a supporting plate or magazine 19 upon which a stack of blanks 20 are positioned. Said blanks are held in alignment by the forward upright rods 21 and the inclined rods 22.

Slidably mounted in a way 23 extending longitudinally of the feeder there is a carriage 24 adapted to reciprocate therein toward and away from the break-down rollers. Mounted on the forward end of said carriage, Fig. 5, there is a clamping lever 25 having a gripping head 26 pivotally mounted upon an ear 27 extending upwardly from the forward end of said carriage. The head 26 is adapted to register with a recessed head 28 on the end of the carriage so as to provide a suitable jaw for clamping said blank 20. The movement of the jaw is effected by the longitudinal sliding movement of a clamp bar 29 relative to said carriage, said bar having pivotally connected therewith a tube 30 in which a rod 31 extends, said rod being pivotally connected to the other end of the lever 25 from the head 26. Interposed between the bar and lever, and surrounding said rod and tube, there is a compression spring 32.

As the bar 29 is retracted relative to the carriage, as illustrated in Fig. 6, it carries the connection with the jaw lever rearwardly, which movement causes the jaw to open for releasing a blank and receiving a new one. The forward movement of said bar relative to the carriage, as illustrated in Fig. 5, forces the clamping jaw to closed position for clamping the blank under spring tension of the spring 32.

For feeding the lowermost blank 20 from the stack, there is provided a plate 33, see Fig. 1, slidable in a way 34, which plate is adapted to reciprocate below the stack of blanks engaging the side edge of the lower blank and sliding it from under the stack laterally against an adjustable stop 35, Fig. 2. Said plate has a rigid depending arm 36 to which is pivotally connected a turn buckle link 37 extending laterally, as shown in Fig. 4, with the other end pivotally connected with a lever arm 38. Said lever arm extends vertically and is pivotally mounted to the frame of the machine, as indicated at 39. Intermediate the ends thereof there is a roller 40 which engages in a cam groove 41 extending about the periphery of a drum 42 which is mounted on a driving shaft 43.

By rotation of the shaft 43 and drum 42, the lever arm 38 will be reciprocated back and forth in such manner as to cause the plate 33 to slide the blank 20 from the stack to the position indicated by the blank 20a in Fig. 2, between the jaws 26 and 28.

The shaft 43 is driven through a suitable clutch contained in the clutch housing 44, which clutch may be controlled by a manually operated handle 45 pivotally connected at 46 to a rigid arm 47 on the frame. The drive, therefore, comprises a sprocket wheel 48 driven by a chain 49 from a sprocket wheel 50 on a shaft 51 of the lower roller 11. An idler sprocket 52 mounted on an arm 53 may be brought into engagement with the chain 49 for taking up slack therein. Said idler sprocket is adjusted through the medium of a manually adjustable lever 54 which is a continuation of the arm 53 fulcrumed at 55 and secured in adjusted position by a nut 56 movable in a slot 57 of the frame. Thus, the main drive shaft 43 of the feeding mechanism is driven from the shaft of the lower break-down roller which in turn is driven by any suitable power means not disclosed herein, the driving power to said shaft being manually connected and disconnected for starting or stopping the operation of the machine by the clutch lever handle 45.

On the opposite side of the machine from the driving mechanism there is a pair of cams 58 and 59 mounted on said shaft 43 to be rotated thereby. The cam 59 carries a roller 60 projecting laterally therefrom. Pivotally mounted upon the lower part of the frame at 61 (Fig. 3), there is a lever 62 extending upwardly between the cams 58 and 59. Said lever is provided with a roller 63 extending on each side thereof in position to be engaged by said cams, respectively. Connected with the upper free end of the lever 62 there is an adjustable turn buckle connecting rod 64 having its opposite end pivotally connected to a pin 65 secured to a toothed rack bar 66 (Fig. 4). The teeth of the rack bar 66 which extend along the inner edge thereof mesh with the teeth on the gear 67 rotatably mounted on a vertical shaft 68 within a housing 69. Above said gear, and keyed to said shaft 68, there is a toothed gear 70 of larger diameter adapted to mesh with the teeth 71 on the carriage 24.

The rotation of the main shaft 43 will cause the cams 58 and 59 to rotate to actuate the lever 62 which in turn imparts a forward movement to the toothed rack 66. The movement of the rack 66 causes a corresponding action of the carriage 24 through the medium of the gears 67 and 70 mounted on the shaft 68 in the housing 69, thereby imparting the required longitudinal forward movement of the carriage for feeding the blank to the rollers.

The roller 60 on the cam 59 engages a shoe 72 on a trip lever 73 fulcrumed to the frame of the machine at 74. The other end of said lever is connected by a rod 75 to a trip dog 76 through an adjustable connection with an arm 77. Said dog is pivotally supported by a rod 78 in a bearing 79 so that the dog extends directly over the clamp bar 29 slidable in the carriage 24 in position to be engaged by a release trip lever 80.

Said lever 80 is pivotally mounted in the recess at the rear end of the carriage by a pin 81 and has an upwardly protruding angular head 82 on one end thereof under which there is a compression spring 83. The adjacent end of the clamp bar is reduced to provide a shoulder 84 and a second shoulder 85. There is a stop 87 secured to the carriage in position to be engaged by the shoulder 84 for limiting the rearward sliding movement of the clamp bar, and the forward end of the release trip 80 is adapted to engage the shoulder 85 for limiting the rearward sliding movement thereof depending upon the position of said trip. The forward end of said bar abuts a compression spring 88 mounted in a cylindrical recess 89 at the forward end of the carriage. Secured to the underside of said bar, and extending through a longitudinal slot 90 in the underside of the carriage, there is a locking dog 91.

For sliding the clamp bar 29 to clamping position, from the position shown in Fig. 7 to that shown in Fig. 6, there is an adjustable dog 92 positioned to engage the dog 91. Said adjustable dog is mounted in a frame 93 slidably mounted in a guide 94. Said dog 92 is adjustable therein by means of a screw 95 on which it is mounted. Pivotally connected with the sliding frame there is a locking lever 96 fulcrumed in a bearing 97, (Figs. 4 and 5), through which a shaft extends to which it is keyed, said shaft having an arm 98 on the opposite side of the bearing. Said arm 98 (Fig. 1) is engaged by the bifurcated end of a bar 99 slidable through a bearing 100 against the compression of a spring 101. The other end of said bar 99 is adapted to be engaged by a projection 102 carried on the periphery of the drum 42. Upon a revolution of said drum, the dog 92 will engage the dog 91 and move the clamp bar to cause the blank to be clamped by the jaws of the clamping lever.

For returning the carriage after each forward feeding movement, there is provided a pair of spiral springs 103 mounted in a housing 104 surrounding the shaft 68 of the gears 67 and 70. Said springs acting upon said gears cause them to move in a reverse direction to the action caused by the cams 58 and 59, thereby returning the carriage from its feeding operation. Associated with said springs there is a ratchet wheel 105 adapted to be engaged by a pawl 106, whereby the tension of the springs may be adjusted through the employment of a wrench on the square head 107.

As best illustrated in Fig. 4, the entire feeding device, including a supporting frame, is adjustably mounted upon the uprights 10 so as to swing to and from feeding position relative to said machine. Thus, the automatic feeder may be conveniently sprung away from the break-down rollers to give access thereto for repairs, changes in rollers or manual operation. For this purpose the frame of the machine is rigidly mounted upon a hinged sleeve 108 rotatably supported on a hinge pin 109 extending upwardly from a part of the upright support of the break-down machine. An adjusting screw 110 is provided at the top thereof for obtaining vertical adjustment of the feeding machine relative to the break-down rollers.

The operation of the machine may be described as follows: When the carriage 24 is at its extreme outer position, as illustrated in Figs. 1, 2, 3 and 6, the rotating shaft 43 causes the cam groove 41 to operate the slide 33 to engage the lowermost blank 20 in the stack to slide it laterally between the open jaw members 26 and 28 (Fig. 6). Said jaw members are open by reason of the contraction of the clamp bar 29, due to the spring 88.

The blank is then clamped between the jaws by the forward movement of the clamp bar 29, relative to the carriage 24, compressing the spring 88, permitting the trip 80 to drop into position against the shoulder 85. This forward movement of the bar raises the clamping lever by the change in position of its pivotal connection therewith through the sleeve and rod 30 and 31 compressing the spring 32. This action is caused by the projection 102 on the drum 42 engaging the lever 98 which moves the dog 91 carried by said bar, whereby said bar is moved therewith.

The trip 80 maintains the jaw in clamping position on the blank after this operation. The cams 58 and 59 thereupon actuate the lever 62 to slide the rack 66 forwardly by means of the connecting rod 64. The movement of the rack 66 rotates the shaft 68 through gear 67, which in turn winds up the springs 103 and rotates the larger gear 70 engaging the rack teeth 71 on the carriage for moving it forward. The initial movement of the carriage by the cams is sufficient to carry the clamped blank between the break-down rollers 11 and 15 which act thereon for the first break-down operation. Upon disengagement of the blank by the rollers, the springs 103 return the carriage with the blanks still gripped therein preparatory to the next operation.

The following movements of the cams 58 and 59 again carry the carriage forward to present the blank to the break-down rollers for the second operation, whereupon the blank is released by the jaws and carried through the rollers to the off bearing side thereof.

Upon the blank being presented for the second operation, the jaws are released in the following manner: Prior to the second forward movement, the roller 60 strikes the shoe 72, which lowers the trip dog 76 into the path of the head 82 on the release trip 80, forcing it downward against the tension of the spring 83 to release the forward end thereof from engagement with the shoulder 85 on the clamp bar. The spring 88 will thereupon return the clamp bar to its normal position, which movement opens the jaws and releases the blank to the action of the break-down rollers.

After this action, the cycle is again repeated, the next blank being moved laterally between the jaws to be clamped thereby, and the operation is repeated.

The operation of the machine may be discontinued irrespective of the continued driving of the break-down rollers by throwing out the driving clutch through the medium of the hand lever 45. To temporarily remove the machine the hand lever 54 may be operated to loosen the chain which can thereupon readily be removed from the sprocket 50 and the machine swung about the axis of its support 108. Vertical adjustment of the machine in respect to the rollers may be had through manipulation of the screw 110. Other adjustments may be noted for use wherein different sized blanks are employed, such as the screw 95 for adjusting the position of the dog 92 to control the timing of the action by the blank gripping jaws. Also the guide rods 20 and 22 may be adjusted by means of the elongated slots in the plate upon which they are mounted (Fig. 2), as well as the adjustment of the stop 35. The variation in tension of the return springs 103 may be made through the medium of the ratchet wheel 105 with its pawl 106 adjusted through the nut 107.

From the foregoing it will be noted that any blank within certain limits of size and thickness may be fed to the break-down machine automatically in the same manner as has heretofore been practiced by an operator, wherein the blank is presented between the rollers for the first operation, withdrawn, and presented for the second operation, whereupon it is released.

The invention claimed is:

1. An automatic feed for blanks, including a magazine for holding a plurality of blanks to be fed, a reciprocating carriage, a gripping member on said carriage, means for transferring a blank from the magazine to said member, a clamp bar carried by said carriage for actuating said member to grip the blank, means for locking said bar in actuating position, a power operated cam for periodically moving said carriage to operating position, a spring for returning said carriage, and a trip controlled by said cam for releasing said clamp bar upon the second movement of the carriage to operating position, whereby the blank may be released from the gripping member.

2. In a blank feeding device, the combination with a break-down machine including a pair of break-down rolls, a magazine for holding a plurality of blanks to be fed between said rolls, a reciprocating carriage, a source of power for moving said carriage for the feeding operation, a spring for returning said carriage, a clamping jaw on the feeding end of said carriage, means actuated by said source of power for transferring a blank from the magazine to said jaw, a cam actuated by said source of power, and mechanism operable by said cam for closing said jaw to clamp said blank, and opening the jaw to release the blank at the end of the feeding operation.

3. In an automatic feed for blanks, a magazine for holding a plurality of blanks to be fed, a reciprocating carriage, a cam for moving said carriage in one direction, a spring for returning the carriage, a clamping jaw mounted on said carriage, a sliding plate for engaging and sliding one of said blanks from the magazine to the jaw when in open position, a clamp bar slidable on said carriage for moving the jaw to clamping position, a cam for operating said plate, means actuated by said last-mentioned cam for moving said bar to jaw clamping position, means actuated by said first-mentioned cam to move said bar to jaw releasing position, and power driven means for actuating said cams in timed relation.

4. In an automatic feed for blanks, a magazine for holding a plurality of blanks to be fed, a reciprocating carriage, a cam for moving said carriage in one direction, a spring for returning the carriage, a clamping jaw mounted on said carriage, a sliding plate for engaging and sliding one of said blanks from the magazine to the jaw when in open position, a clamp bar slidable on said carriage for moving the jaw to clamping position, a cam for operating said plate, means actuated by said last-mentioned cam for moving said bar to jaw clamping position, means actuated by said first-mentioned cam to move said bar to jaw releasing position, and power driven means for actuating said cams in timed relation, the cam for moving said carriage being so formed as to cause two movements thereof for each movement of the sliding plate and clamping jaws.

5. An automatic feed for blanks, a magazine for holding a plurality of blanks to be fed, a reciprocating carriage, a cam for moving said carriage in one direction, a spring for returning the carriage, a clamping jaw mounted on said carriage, a sliding plate for engaging and sliding one of said blanks from the magazine to the jaw when in open position, a clamp bar slidable on said carriage for moving the jaw to clamping position, a cam for operating said plate, means actuated by said last-mentioned cam for moving said bar to jaw clamping position, means actuated by said first-mentioned cam to move said bar to jaw releasing position, and power driven means for actuating said cams in timed relation for accommodating the feed to blanks of different sizes.

6. In a blank feeding device, the combination with a break-down machine to which the blanks are adapted to be fed, of a magazine for holding a plurality of blanks, means for removing said blanks one at a time from the magazine, a gripping member for receiving and gripping said blanks removed therefrom, power driven mechanism for moving said member for successively presenting the blanks to the break-down machine, and a spring for successively withdrawing said member and blank after the first operation and causing the blank to be released to the break-down machine after the second operation.

7. In a blank feeding device, the combination with a break-down machine to which the blanks are adapted to be fed, of a magazine for holding a plurality of said blanks stacked one upon the other, a horizontally reciprocating plate for engaging the lowermost blank and sliding it laterally from the bottom of the magazine, a gripping member positioned to receive said lowermost blank and grip the same, means for actuating said member to present the blank to the break-down machine for a first operation, and means for causing the release of said blank from the gripping member to said machine after the second operation.

8. In a blank feeding device, the combination with a pair of break-down rolls to which the blanks are adapted to be fed, a movable carriage having a blank gripping member thereon, means for moving said carriage to present the blank between the rolls for a series of operations thereon, a spring for retracting the carriage at the end of each operation, and means effective at the completion of the last operation for releasing the blank for permitting it to be discharged through the rolls.

9. An automatic feed for blanks, including a magazine for holding a plurality of blanks to be fed, a reciprocating carriage, a gripping member on said carriage, means for transferring a blank from the magazine to said member to be gripped thereby, power-operated means for periodically moving said carriage and member to blank feeding position, a spring for returning said carriage and member at the end of each feeding operation, and means for releasing the blank from the gripping member upon the completion of the second feeding operation, whereby the blank may be discharged therefrom.

10. An automatic feed for blanks including a magazine for holding a plurality of blanks to be fed, a reciprocating carriage, a gripping member on said carriage, means for transferring a blank from the magazine to said member, a clamp bar carried by said carriage for actuating said member to grip the blank, means for locking said bar in actuating position, means for periodically moving said carriage to and from operating position, and a trip controlled by said means for releasing said clamp bar upon the second movement of the carriage to operating position, whereby the blank may be released from the gripping member.

11. In an automatic feed for blanks, a magazine for holding a plurality of blanks to be fed, a reciprocating carriage, a cam for moving said carriage in one direction, a spring for returning the carriage, a clamping jaw mounted on said carriage, a sliding plate for engaging and sliding one of said blanks from the magazine to the jaw when in open position, a cam for operating said plate, means actuated by said cams for closing and opening said jaw, and power driven means for actuating said cams in timed relation.

CHARLES R. MOON.